US008508524B2

(12) United States Patent
Lebrun et al.

(10) Patent No.: US 8,508,524 B2
(45) Date of Patent: Aug. 13, 2013

(54) INTEGRATED METHOD OF DETECTING AN IMAGE DEFECT IN A LIQUID CRYSTAL SCREEN

(75) Inventors: Hugues Lebrun, Coublevie (FR); Gérard Voisin, Saint Medard en Jalles (FR)

(73) Assignee: Thales, Neuilly sur Seine (FR)

( * ) Notice: Subject to any disclaimer, the term of this patent is extended or adjusted under 35 U.S.C. 154(b) by 270 days.

(21) Appl. No.: 12/672,486

(22) PCT Filed: Aug. 4, 2008

(86) PCT No.: PCT/EP2008/060235
§ 371 (c)(1), (2), (4) Date: Mar. 4, 2010

(87) PCT Pub. No.: WO2009/019253
PCT Pub. Date: Feb. 12, 2009

(65) Prior Publication Data

US 2011/0074664 A1 Mar. 31, 2011

(30) Foreign Application Priority Data

Aug. 7, 2007 (FR) .................................... 07 05753

(51) Int. Cl.
*G06F 3/038* (2013.01)

(52) U.S. Cl.
USPC .............................. 345/212; 345/98; 345/204

(58) Field of Classification Search
USPC ........................................... 345/212, 204, 98
See application file for complete search history.

(56) References Cited

U.S. PATENT DOCUMENTS

| | | | | |
|---|---|---|---|---|
| 4,001,808 | A | 1/1977 | Ebihara et al. | |
| 5,440,322 | A * | 8/1995 | Prince et al. | 345/58 |
| 5,949,194 | A * | 9/1999 | Kawakami et al. | 315/169.4 |
| 6,040,814 | A * | 3/2000 | Murakami et al. | 345/94 |
| 7,009,601 | B1 * | 3/2006 | Sherlock et al. | 345/204 |
| 2004/0164979 | A1 * | 8/2004 | Lee | 345/212 |
| 2005/0116657 | A1 | 6/2005 | Park et al. | |
| 2006/0103643 | A1 * | 5/2006 | Mathew et al. | 345/212 |

FOREIGN PATENT DOCUMENTS

| | | | |
|---|---|---|---|
| EP | 1 538 588 | A2 | 6/2005 |
| WO | 2006/036391 | A2 | 4/2006 |

* cited by examiner

*Primary Examiner* — Latanya Bibbins
(74) *Attorney, Agent, or Firm* — Baker & Hostetler, LLP

(57) ABSTRACT

An integrated method of detecting an image defect in an LCD screen consists in verifying the consumption of current on a power supply bus of the image display means (row driver 20, column driver 30, counter electrode CE), during capacitive charges or discharges of the selection lines $L_i$ and/or columns $Col_{Rj}$. The method comprises the integration of a current measurement chain comprising a measurement resistor Rm on the power supply bus and measurement 41 and comparison 42 circuits providing outside the screen a detection signal Sd which is processed by an external circuit for safety management.

10 Claims, 5 Drawing Sheets

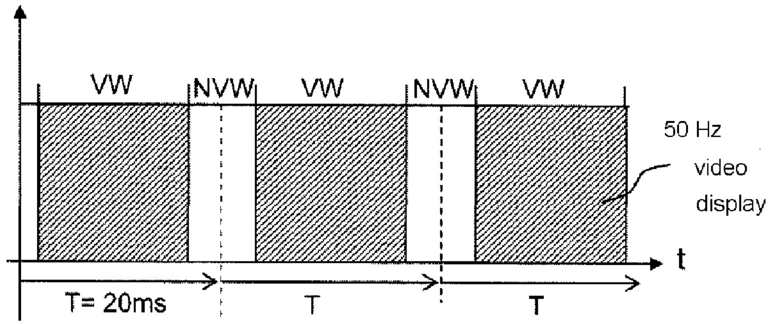
FIG.3
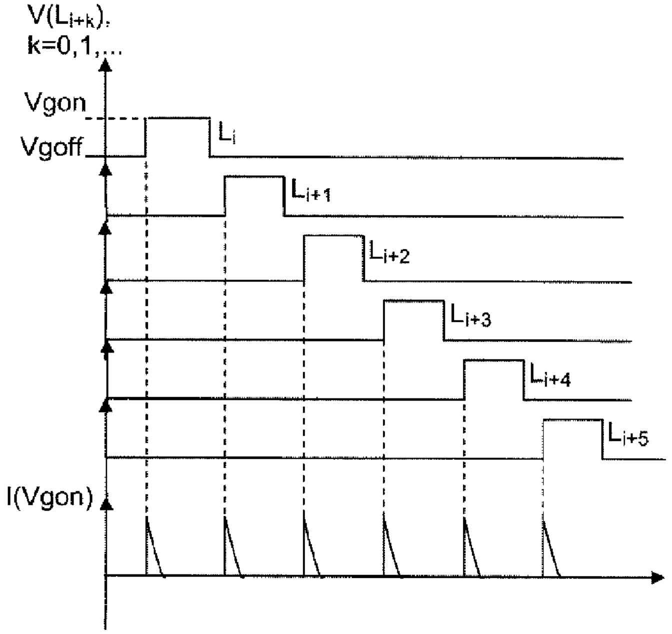
FIG.4
FIG.5
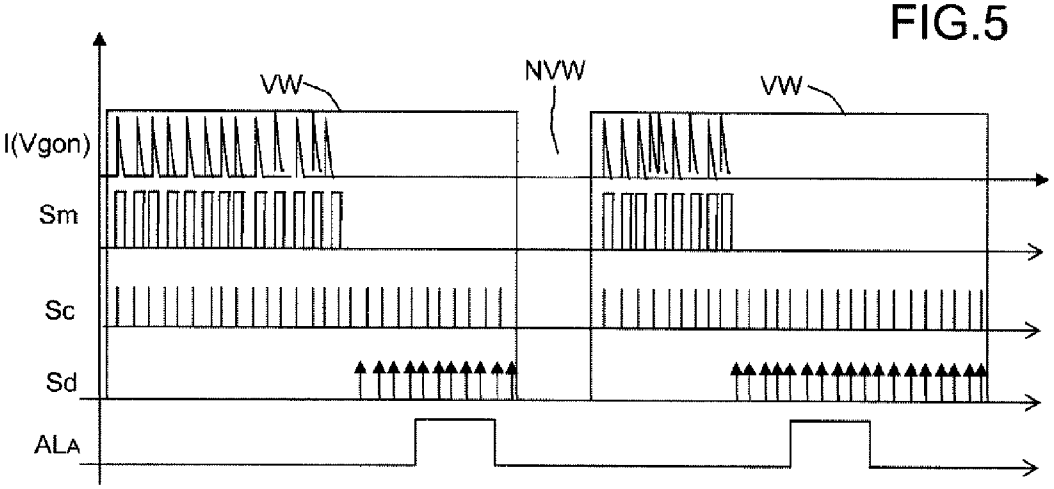

INTEGRATED METHOD OF DETECTING AN IMAGE DEFECT IN A LIQUID CRYSTAL SCREEN

CROSS-REFERENCE TO RELATED APPLICATIONS

This application is a National Stage of International patent application PCT/EP2008/060235, filed on Aug. 4, 2008, which claims priority to foreign French patent application No. FR 07 05753, filed on Aug. 7, 2007, the disclosures of which are hereby incorporated by reference in their entirety.

FIELD OF THE INVENTION

The present invention relates to a method for detecting image defects in liquid crystal screens. The invention applies more particularly to liquid crystal screens used on vehicle dashboards, in particular for aircraft.

BACKGROUND OF THE INVENTION

Liquid crystal color screens are universally used in aircraft and helicopter cockpit viewing systems. They constitute an essential man-machine interface, providing the pilot, by means of elaborate symbolic images, with information which he requires in order to accomplish his various assignments. This displayed information must therefore be very reliable.

Now, it may happen that these screens exhibit display defects, and notably a defect termed frozen image, corresponding to a defect in the video display chain, generally due to an operating defect in the shift registers of the integrated line or column control circuits (drivers) by which the display of the video on the screen is supervised or to a lack of presence of the vertical scan synchronization signal at the input of the LCD screen.

The structure of a shift register is well known. Let us consider a shift register of n bits: this is a semi-conductor device comprising n stages in cascade, the output of each stage forming the input of the next. Each stage comprises a plurality of semi-conductor transistors. These transistors must ensure numerous switchings. Some of these transistors undergo a permanent gate stress, and this may give rise to a drift in their threshold voltage and hence a malfunction of the transistor: the transistor no longer switches. In a switching stage in which a transistor no longer switches, data transfer no longer takes place; the data output by this stage and by the following stages will therefore no longer change. As these are the shift registers of the line selection control circuit, the lines controlled by the output of these stages will therefore always remain in the same unselected state: scanning of the matrix selection lines no longer takes place. Let us assume that such an interruption of line scanning occurs. Having regard to the very high resistivity of liquid crystals and transistors in the off state, the pixels of an LCD screen have excellent information storage performance. The same image can thus remain displayed for several seconds, after this interruption.

Another display defect is the loss of video information in the image transmission chain, for example related to a failure of a color video pathway. For example, the color red is used to display alert signals. It is conceivable that a failure of the red video pathway may not be detected swiftly by the pilot on an operational image. In this case, the pilot's reaction may be too sluggish. It is thus necessary to be able to identify this defect.

A pilot may not notice a display defect, all the more when certain symbolic images, associated with information useful to the pilot, do not vary very quickly. He might therefore continue to trust the displayed image, although it is incorrect or no longer correct. Civil avionics safety recommendations prohibit this type of event. It is therefore necessary to provide a system for detecting a display defect.

According to the state of the art, for the selection line addressing circuit, the detection of this defect is usually carried out by making certain, in the output signal of the last stage of the shift registers, of the synchronous presence of the line scan signal on this output.

This scheme has various drawbacks. It makes it necessary to be able to physically measure the signal at the output of the last stage, and therefore to provide an additional conductor line, dedicated to this measurement. Furthermore, the information measured is that of the last line of the shift register. But the defect may lie further on, at the level of the voltage boosting circuit which is usually provided between the outputs of the shift register and the rows of the matrix, so as to pass from the digital voltage levels, in the shift registers, to the analog voltage levels necessary for controlling the image dots.

For the circuit for controlling the display of the video data on the columns, the defect detection consists in detecting the presence of a video signal at the input of the column control circuits, this being very insufficient. Notably this does not give any information about the operation of the shift register and/or of the digital analog conversion circuit and/or of the amplifying circuit for the column control devices and does not make it possible to be certain of the integrity of the display of one color in particular. Now, in the civil avionics context, the color red corresponds to the display of safety-related information. There is therefore a definite benefit in being able to be certain of the integrity of the display chain for this color at least.

SUMMARY OF THE INVENTION

The subject of the invention is a more efficacious method of image defect detection, which makes it possible to test in a reliable manner the integrity of the whole of the video display chain.

The invention relates to an integrated method for the detection of a display defect of an image in an LCD screen comprising pixel electrodes arranged in matrix fashion in data lines and selection lines, a common counter-electrode and image display means piloted by a video signal, and applying control voltage levels to said pixel electrodes via said data and selection lines and to the counter-electrode, said video signal, the display means, the selection and data lines and the pixel electrodes forming an image display control video chain. The method consists in verifying the integrity of said video chain, by means of detecting the consumption of current on at least one power supply bus of said display means during capacitive charges or discharges of the data and/or selection lines of the LCD screen.

The method comprises the integration of a measurement chain comprising a resistor disposed in series on the power supply bus, a circuit for measuring the current in said resistor and for outputting a corresponding digital measurement signal, and a comparison circuit for comparing said digital measurement signal being envisaged so as to provide if appropriate an image defect detection signal.

The invention also relates to a liquid crystal screen comprising corresponding integrated detection means.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

FIG. 3 details a video image display sequence in an LCD screen;

FIG. 4 is a timechart of the signals of the selection lines, in a video image display window, and of the current in the power supply bus measured in this window by a measurement chain according to the invention;

FIG. 5 illustrates an exemplary timechart of the corresponding detection and alarm generation signals;

DETAILED DESCRIPTION

Figure 1:
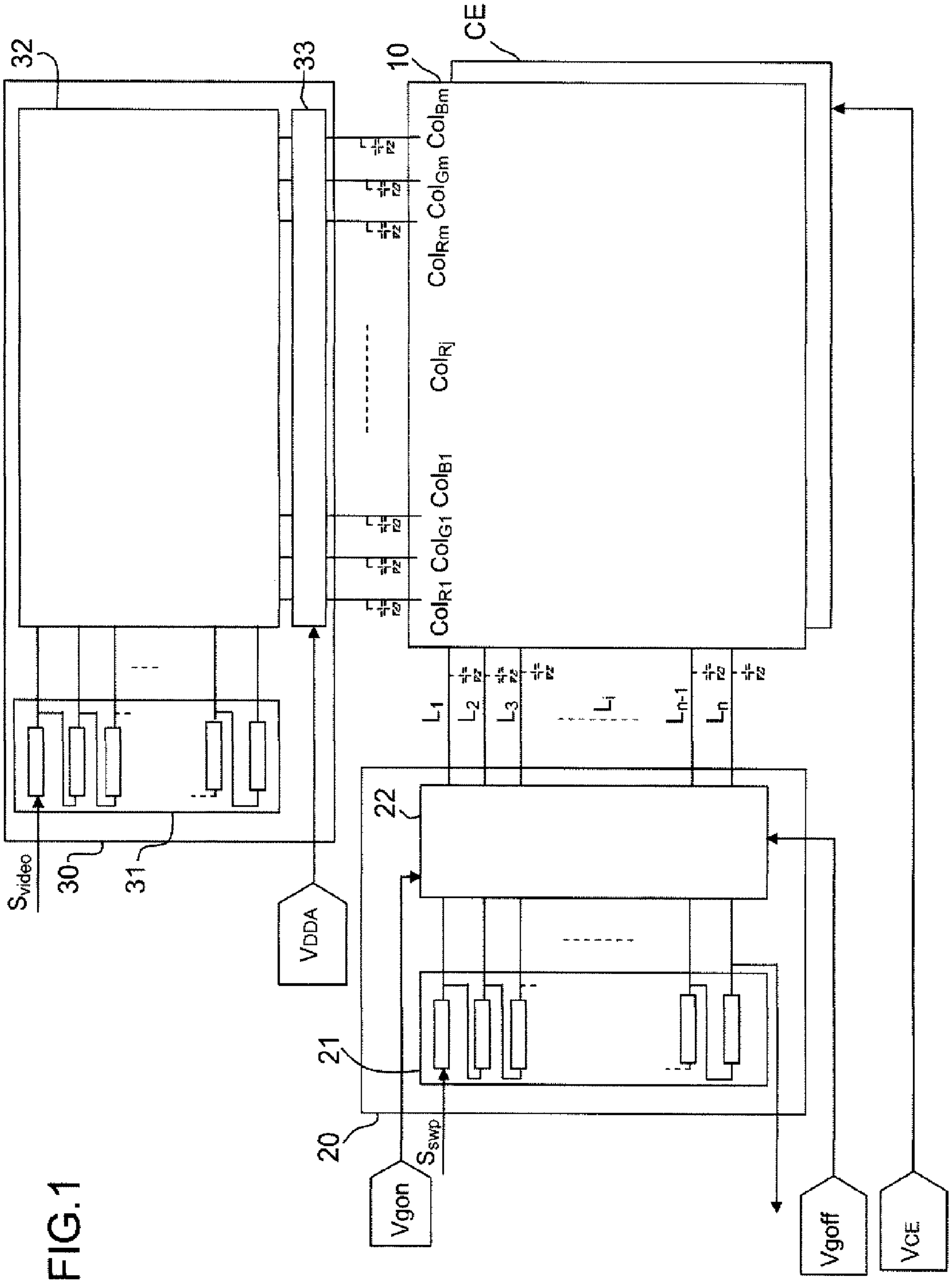
FIG. 1 illustrates the row and column control circuits in an LCD screen.

FIG. 1 depicts an architecture of an LCD screen. This architecture is well known. It comprises a matrix array of pixels or image dots, each consisting of a switching device and of an electro-optical cell of which one electrode termed the pixel electrode is connected to the switching device, and the other electrode termed the counter-electrode CE is an electrode common to all the pixels. The matrix 10 comprising the pixel electrodes and their switching devices is embodied on a substrate plate. The counter-electrode CE is embodied on a counter-plate of the screen which also supports the colored filters. The display of an image on such a screen is carried out by display means allowing the application of appropriate control levels to the electrodes of the pixels.

As this is the common pixel electrode, or counter-electrode CE, it receives a control voltage $V_{CE}$ appropriate to the mode of addressing of the screen, through a respective dc voltage supply bus.

As they are pixel electrodes, their addressing is performed by way of selection lines $L_i$, i integer, i∈[1, . . . n], which each control the on or off state of the switching devices arranged on this line, and of data columns or lines, $Col_{Rj}$, $Col_{Gj}$, $Col_{Bj}$, which each transmit a voltage corresponding to a gray level to be displayed, on the electrode of a selected pixel, arranged on the column. In the example, a color screen has been chosen, with a matrix of colored filters with three colors red R, green G and blue B (embodied on the counter-plate). There is thus an arrangement of columns corresponding to the chosen color arrangement. In the example, a simple arrangement of stripe type has been chosen with repetition of an R G B pattern on the columns, and from row to row.

The addressing circuits for these pixel electrodes comprise a selection line control circuit 20, dubbed a "row driver" in the technical literature and a data control circuit 30, dubbed a "column driver" in the technical literature. These control circuits can be integrated circuits built into the active matrix (that is to say they are embodied on the same substrate plate as the active matrix) or external circuits. In the latter case, they are tied to the active matrix by an appropriate mode of connection, for example by heat-bonding, transfer of the integrated circuits onto glass, termed COG ("Chip On Glass") transfer, or any other mode of connection.

The control circuit 20 for the selection lines (row driver) chiefly comprises a shift register 21 (which may in practice be formed of several chained circuits, as a function of the number n of rows of the matrix), for sequentially addressing, at a vertical scan frequency, each of the grid rows of the matrix: the scan signal $S_{swp}$ is applied as input to the first stage of the register and is transferred progressively toward the following stages at the scan frequency (row frequency) defined by the row driver control clock. The circuit 20 also comprises a voltage-booster circuit 22, connected between the register and the lines. Its function is to transform the low-voltage levels at the output of the shift register (logic 3 volts typically) into analog signals, of voltage levels Vgon and Vgoff, appropriate to the technology of the pixel switching devices (transistors). More specially, the voltage Vgon is that which switches the transistors of a selected row $L_i$ to the on state (closed), thereby making it possible to apply the video voltage applied to the columns, to the corresponding pixels, all the transistors of the other rows $L_k$, k≠i, having their gate taken to the voltage Vgoff, to keep them in the off state (open).

The data control circuit 31 receives as input the video signal $S_{video}$ to be displayed, so as to apply the voltages to the columns of the matrix corresponding to the gray levels to be displayed for each image. It chiefly comprises a shift register (which may in practice be formed of several chained circuits or components, as a function of the number m of columns of the matrix), which drives the sample-and-hold circuit which allows the storage on a circuit 32 included in the circuit 30 of the video signal to be displayed on the columns. Each stored datum indicates for a column of the matrix the gray level to be applied. It is transferred at the row selection rate to a circuit 33 comprising digital/analog converters. Typically, a gray level is coded on 6 or 8 bits. The circuit 33 therefore comprises digital/analog converters and current amplifiers associated with coding tables for providing and applying the corresponding levels of analog voltage to the columns, at the selection line selection rate: with each new selected row, the previously sampled content of the data registers is applied as input to the converters, which each provide as output a corresponding analog voltage level. The output of these converters is connected to a current amplifier whose function is to rapidly charge the column during the selection of the row. The digital/analog converters as well as the current amplifiers are supplied by a dc voltage supply bus $V_{DDA}$ (13 volts in one example).

The circuits for addressing the pixels of the screen comprise in a known manner other control devices, notably for inverting the polarity of the voltage applied to the pixels (row, column or point inversion), or for taking account of the structure of the colored filter of the matrix (quad, stripe structure etc.) etc.

It will be noted that the invention is not limited to a particular arrangement, or to addressing options which vary according to the products and their applications. Those skilled in the art will know how to apply the invention which will now be presented with reference to FIG. 2*a* et seq., to a given specific screen, by applying the various teachings which will be given hereinafter.

To verify the integrity of the matrix video display chain, and more particularly to detect an image defect, an integrated test method according to the invention measures the current on the active associated power supply buses while the columns are being charged with the analog voltage corresponding to the gray level desired on the image. It is shown that this measurement of current makes it possible to verify the integrity of the whole of the video display chain.

Indeed, the rows and columns of the matrix are capacitive lines, which are charged and/or discharged at the line or horizontal frequency. The capacitance of each row and the equivalent capacitance of the columns are high. The columns furthermore have a strong capacitive coupling with the signal $V_{CE}$ applied to the counter-electrode. It is thus possible to measure a positive or negative inrush of current corresponding to the charging or discharging of these lines on a corresponding power supply bus: Vgon for the rows; $V_{DDA}$ and/or $V_{CE}$ for the columns. This current inrush can only occur if the voltage is actually applied to the rows and/or the columns of the matrix: that is to say if the row is indeed selected and/or if the video data are indeed applied to the columns.

This current measurement thus makes it possible to verify not only the proper operation of the shift registers 21, or 31, but more generally of the circuits upstream, which bring the input signal $S_{swp}$ or $S_{video}$, and those downstream which apply an analog voltage to a corresponding row/or column: for the addressing of the rows, this will involve the voltage boosting circuit 22. For the addressing of the columns it will involve the whole of the connectivity and storage chain, switching, digital analog conversion and amplification (circuits 32 and 33).

FIG. 2 illustrates the principle of a current measurement chain 40 according to the invention. It chiefly comprises a resistor Rm associated with a current measuring circuit A, which provides a measurement signal Sm. The resistor Rm is connected in series on the power supply bus $V_{DD}$ and a driver DRV of a capacitive line LC. This signal is then compared (circuit 42) with an expected signal Sc, typically a pulse signal synchronous with the line scan signal, so as to provide a defect detection signal Sd. This signal is then typically processed by an alarm management device 50, generally external, specific to the application using the screen concerned, so as to provide an alarm signal AL, if appropriate. In an avionics application, this detection signal Sd will thus typically be routed to the viewing system and more specially to the alarms management part: audible alarm and/or safety message, by warning light etc.

In practice, the measurement circuit 40 is placed upstream of the row and column control or counter-electrode circuits 20 and 30, that is to say between the "analog" power supply bus and the corresponding power supply input in the control circuit. Indeed, in this upstream part, one is away from the glass supporting the active zone of the matrix and fairly generally on a printed circuit, thereby facilitating the integration of the measurement chain.

Figure 2A:
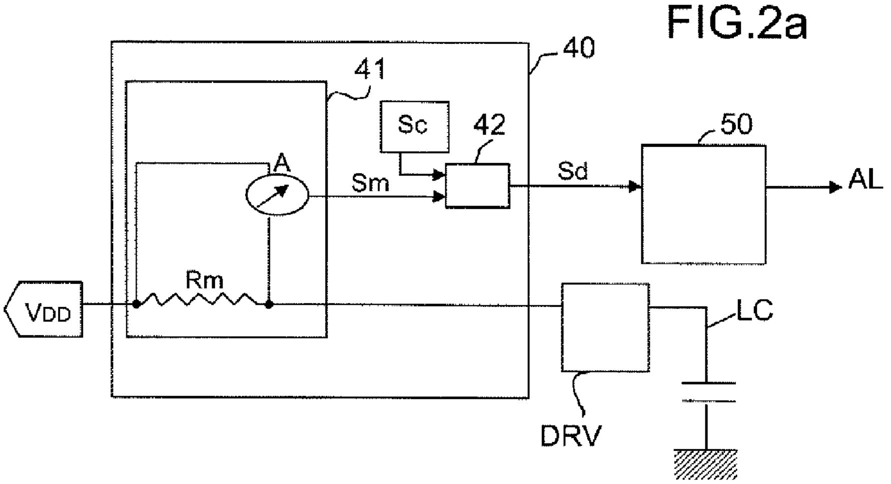
FIGS. 2*a* and 2*b* are respectively a block diagram of a measurement chain used in an image defect detection method according to the invention; and a diagram of an active matrix of an LCD screen in which such a chain is integrated so as to test the integrity of the line scan function and of the color display function.
Figure 2B:
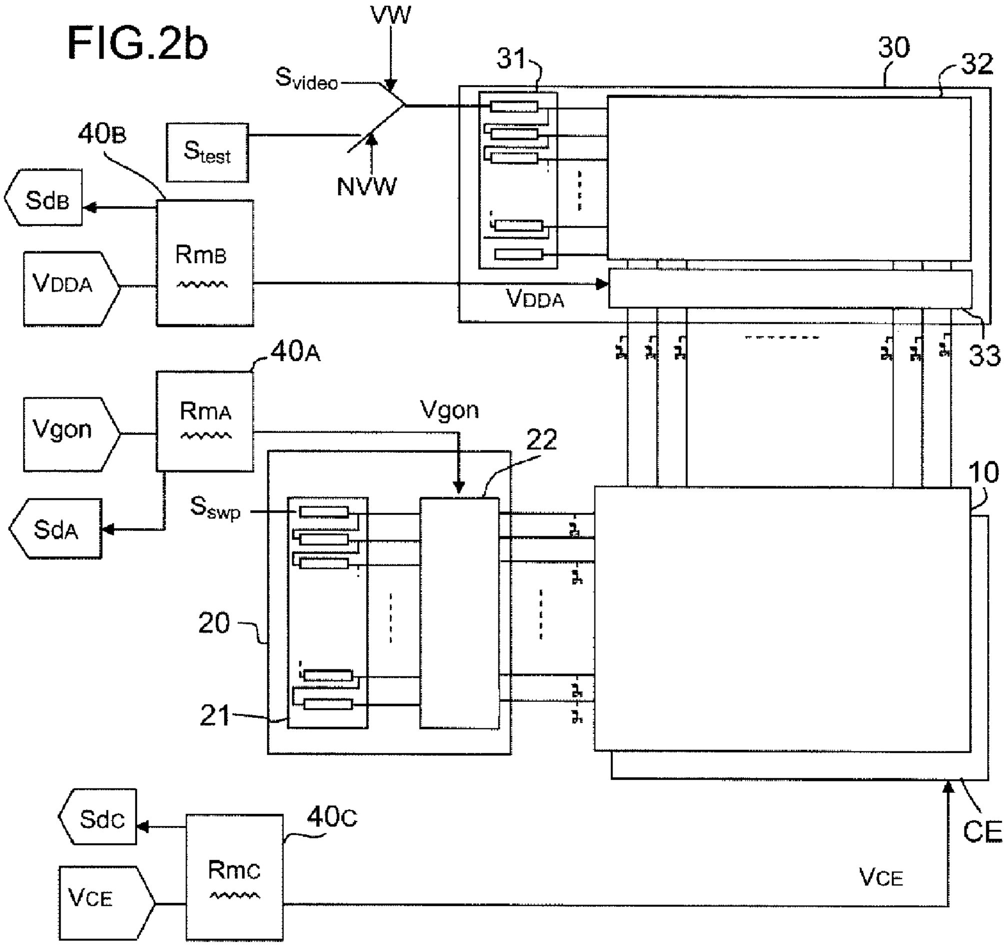

FIG. 2*b* thus illustrates a corresponding architecture of an LCD screen with active matrix, integrating measurement chains according to the invention:

- a first measurement chain 40A is placed on the power supply bus Vgon, which supplies the voltage boosting circuit 22 for the row control circuit 20. It comprises a resistor $Rm_A$ placed in series on the power supply bus, between the bus and the power supply input of the circuit 22. It provides a corresponding detection signal $Sd_A$ as output.
- a second measurement chain 40B is placed on the power supply bus $V_{DDA}$, which supplies the circuit 33 of the digital analog converters of the column control circuit 30. It comprises a resistor $Rm_B$ placed in series on the power supply bus, between the bus and the power supply input of the circuit 33. It provides a corresponding detection signal $Sd_B$ as output.

It is possible to replace, or supplement, the second measurement chain 40B with another measurement chain 40C, represented dashed in the figure, and placed on the power supply bus $V_{CE}$ which supplies the counter-electrode CE. It comprises a resistor $Rm_C$ placed in series on the power supply bus, between the bus and the power supply input of the counter-electrode. It provides a corresponding detection signal $Sd_C$ as output. It has indeed been seen that the columns have a strong capacitive coupling with the counter-electrode. The current measurement for the columns can thus be made on one and/or the other bus $V_{DD}A$ and/or $V_{CE}$.

The implementation of an image defect detection method according to the invention can, as represented in FIG. 2*b*, comprise a measurement chain for the rows and a measurement chain for the columns. This is the optimal configuration for detecting defects which lead to the frozen image problem. However, depending on the requirements of the intended application, it is possible to make do with a single chain, either associated with the rows, or associated with the columns.

The implementation of the detection method differs depending on whether the charging of the rows or of the columns is tested. It is recalled that the displaying of an image on an LCD screen is sequenced image-wise, at a frame period T, comprising an image display period VW during which the selection lines are selected one by one in sequence, and the corresponding video data applied to the columns, and a display-off period NVW, during which no row is selected. Such a sequence is illustrated as an example in FIG. 3. A 50-Hz video display yields a frame period T of 20 ms, about 16 ms of which are used for actual image display, in the display period VW.

The rows being involved, the measurement chain 40A associated with the rows must therefore be activated in the display period VW in which the rows are actually selected: outside of this period, that is to say in the periods NVW, no row is selected; consequently it is normal not to detect any current inrush on the power supply Vgon. On the other hand, the columns being involved, during the display period VW, it is not possible either to make a meaningful measurement of current, since the various voltage levels corresponding to the various gray levels to be displayed for a given image may more or less compensate one another in terms of charge/discharge depending on the nature of the image to be displayed. Furthermore, it is not possible to test the display of one color specifically without disturbing the image. There is therefore provision to activate the measurement chain 40B and/or 40C associated with the columns, in the "display-off" periods NWM.

FIGS. 4 and 5 thus illustrate more particularly the method of testing the selection line control circuit. This method integrates the measurement chain 40A previously described (FIG. 2*b*). In the period WM, the rows are selected one by one in sequence, as illustrated in FIG. 4: a voltage pulse Vgon is applied to each row, at the vertical scan frequency. In the display-off periods NWM, the rows are all at Vgoff.

For each voltage pulse, the measurement chain 40A will be able to measure a current corresponding to the current inrush caused by the charging of the corresponding selection line.

These current inrushes I on the power supply bus Vgon in correspondence with each pulse Vgon are illustrated in FIG. 4.

Thus, the current measuring circuit 41 of the chain is designed to provide as output a pulsed measurement signal Sm, each pulse corresponding to the detection of a current inrush.

This signal is compared with a row frequency signal Sc typically derived from a clock signal synchronous with the scan signal $S_{swp}$. In the example, this signal is "flat" in the display-off windows NVW. This comparison circuit can typically be embodied by means of a NAND gate type logic circuit. When there is no pulse in the measurement signal, this comparison circuit provides a logic voltage pulse as output: this is the detection signal Sd.

This signal is processed by an alarm management device (device 50—FIG. 2*a*). This management device can implement rules for generating a corresponding alarm signal ALA. For example, a rule can stipulate a minimum number of defects (of defect pulses Sd) to generate an alarm. In the example illustrated in FIG. 5 by way of illustration of the measurement method, a succession of four defects is necessary to generate an alarm, which is then processed in an appropriate manner by a safety system of the application concerned. It is noted that the alarms, if any, are generated during the measurement/detection periods, that is to say in the periods VW.

In a practical example, a resistor RMA of low impedance suffices, of the order of 10 ohms for example. For a 10 inch screen, and for an equivalent capacitance of a selection line of the order of 200 picofarads, charged in 0.5 µs to Vgon equal to 30 Volts, a charge spike current I(Vgon) of the order of 12 mA is obtained.

Figure 6:
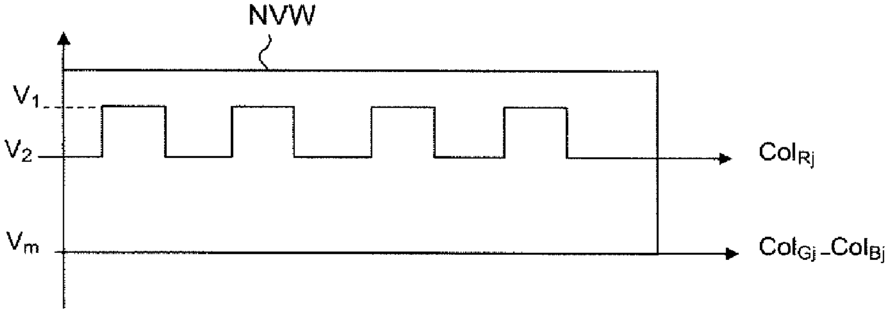
FIG. 6 gives an example of the signals applied to the columns in the windows to test a color.
Figure 7:
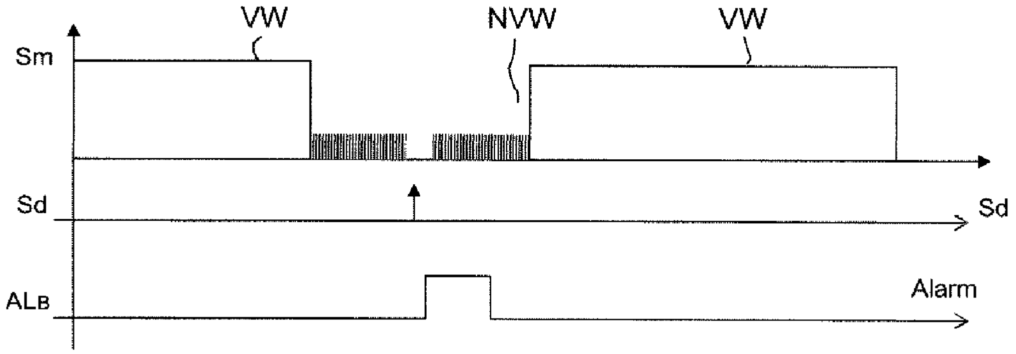
FIG. 7 illustrates a timechart of the corresponding detection and alarm generation signals.

FIGS. 6 and 7 illustrate more particularly the method of testing the column control circuit 30. This method integrates the measurement chain 40B and/or the measurement chain 40C that were described previously (FIG. 2*b*), the detection principle applying identically to both these chains.

This detection principle consists in instructing the displaying of a test image $S_{test}$ in the display-off periods NWM: this test image is determined, programmed, to control one and the same first gray level or one and the same second gray level on columns of the matrix, alternately at the row frequency (that is to say at the row selection frequency, except that the rows are not selected). The first and second gray levels correspond respectively to the lowest and the highest level of the gray scale, that is to say to the maximum voltage excursion. During the period NWM of a frame, all these columns are then alternately raised to the maximum voltage, and to the minimum voltage, at the row frequency. This significant modification of the column signal at the row frequency creates a significant current inrush in the power supply buses VDDA and VCE, this being what is detected.

In practice, the implementation of the method thus gives rise to the operation of the column driver 30 throughout the frame, in the period VW, to display a video image $S_{video}$, and in the period NVW to fictitiously display a test image $S_{test}$. The display is "fictitious" since in these periods NVW, the rows are not selected: the test image is not actually displayed on the screen.

The maxima/minima alternating test sequence is beneficial since it makes it possible to test the control of the gray levels at both ends of the chain.

However, the test sequence could provide for the displaying of just one predefined gray level, the same from one row to another. This is preferably the highest or the lowest gray level of the gray scale, so as to cause a sufficient charge or discharge current inrush.

For a screen using a mode of addressing of the type employing column inversion at least, the video test image will correspond to a one column out of two display.

If a color screen is considered, it is beneficial to be able to test the displaying of a specific color. According to the invention, columns for displaying the test image are selected so as to correspond to a unique color, the columns associated with the other color or with the other colors not being selected. Typically, and as illustrated in FIG. 6, if it is desired to test red, the data to be displayed relate to the red columns $Col_{Rj}$ only. The other columns $Col_{Gj}$, $Col_{Bj}$ remain at a stable voltage level during these periods NVW so as to reduce their contribution to the current inrushes. For example, the test image is such that the red columns switch at the row frequency alternately from the black level to the white level, so as to have the maximum of the voltage excursion, and the other columns retain a stable gray level, for example white. Provision may be made for successive test sequences, for successively testing each of the colors, at test frequencies which can be chosen according to the importance of each color for the application considered.

FIG. 7 illustrates the method of detection with the signals Sm, Sd and ALB, which is similar to that of the row driver (FIG. 5). The comparison signal Sc used is also similar.

The test sequence for the column driver 30 can moreover depend on the mode of addressing of the screen which is tested.

In a screen using a mode of addressing of the type employing column inversion at least, and for an arrangement of the colors on the matrix of stripe type, typically an in-line repetition of a red R, green G, blue B pattern, two successive red columns are driven, one with a positive voltage polarity, and the other a negative voltage polarity. In this case it is understood that there is a compensation of charge and discharge of current: no current inrush will be detected on the bus VDDA. In this case the test sequence will use a video test image programmed to correspond to a one column out of two display of the color red. This is done of course on each color.

Generally, the displaying of a test image according to the invention results in a modification at the row frequency of the column signal on columns selected for testing, so as to create a corresponding significant current inrush in the power supply buses VDDA and VCE, optionally with other columns in an appropriate state reducing their contribution to the current inrushes.

Finally, screens in which the power supply bus VDDA is cut off periodically, at the frame frequency, are known (not represented). In this case, there is provision for the measurement of current to be deactivated during these cutoffs, so as not to generate false defect detections.

These various alternative implementations of the invention do not pose any particular problems of practical embodiment.

In practice, the measurement chain 40B and/or 40C is associated with means for storing/generating at least one test image $S_{test}$. If it is desired to test each of the colors, the same image can be used, each time, in combination with a selection of the columns of the corresponding color. These storage/generation means are embodied in any manner known to those skilled in the art.

For large screens, the column control circuit or column driver is in practice formed of a plurality of chained components, each controlling a group of columns.

In a refinement, the measurement chain for the columns 40B and/or 40C allows a component of the column driver to be tested separately, so as to detect a defect, if any. A corresponding test method then comprises an order to display a test image, corresponding to a selection of the columns of this particular component of the column driver. It is thus possible to test each of the components of the column control circuit, with a sequence of test images, each image defined for a determined component of the driver by using the test method previously described in conjunction with FIGS. 6 and 7.

Figure 8:
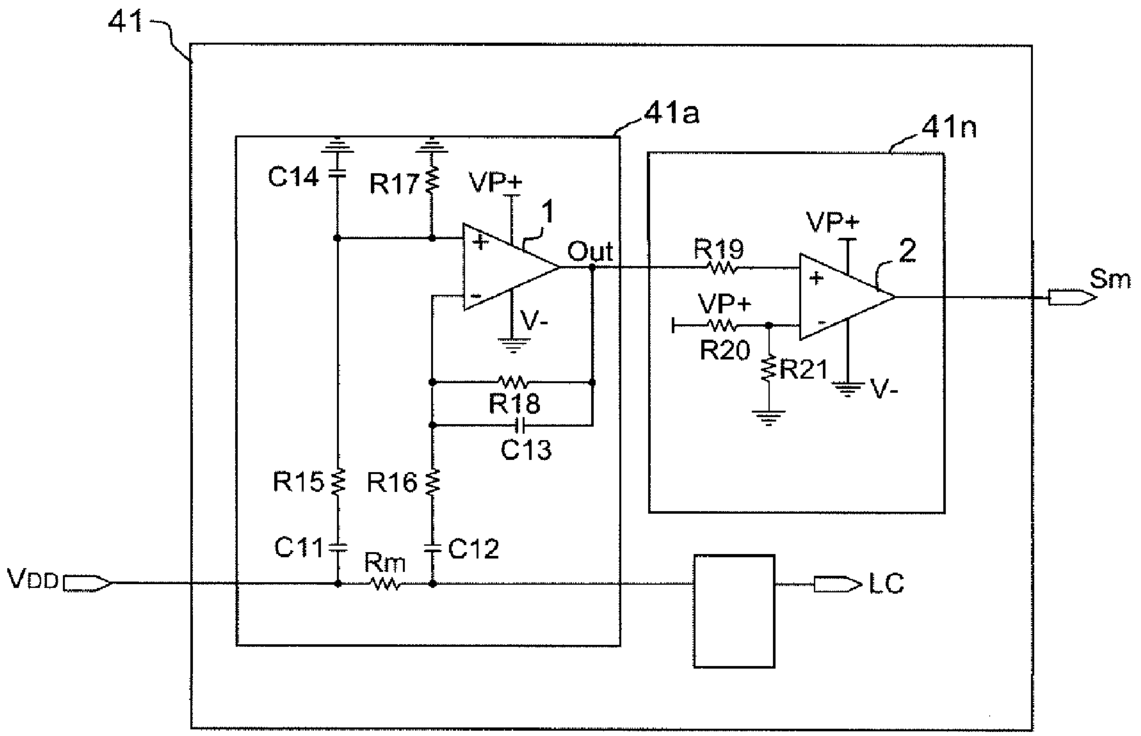
FIG. 8 is a detailed diagram of a possible electronic embodiment of a measurement chain used in a method according to the invention.

FIG. 8 gives a practical example of a measurement chain which can be used in the invention. The resistor Rm is inserted in series in the power supply $V_{DD}$ of the tested driver. A differential amplifier 1, for example an ANALOG DEVICE AD817 amplifier, makes it possible to reject the glitches in the power supply. The amplifier is chosen with a fairly narrow passband (Wien network) to improve the S/N ratio of the output Out of the amplifier. A comparator 2 whose threshold can be adjusted as a function of the LCD screen and of the application transforms the analog signal Out into a digital signal Sm. The presence and the duration of the pulses at the output of the comparator 2 depend on the current inrushes into the measurement resistor Rm.

The image defect detection method which has just been described can be integrated simply into any liquid crystal screen whose integrity it helps to guarantee.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. An integrated method for a detection of a display defect of an image in an LCD screen comprising pixel electrodes arranged in matrix fashion in data lines and selection lines, a common counter-electrode and image display means piloted by a video signal, the method comprising:

applying control voltage levels to said pixel electrodes via said data lines and said selection lines and to the common counter-electrode, wherein said video signal, the image display means, the selection lines, the data lines and the pixel electrodes form an image display control video chain;

verifying an integrity of said image display control video chain, wherein verifying the integrity of said image display video chain comprises measuring a signal representative of current inrushes during capacitive charges or discharges of the data lines and/or the selection lines of the LCD screen by means of activating a current measurement chain of a consumption of current on at least one power supply bus of said image display means, wherein the current consumption measurement chain outputs a corresponding digital measurement signal;

wherein said at least one power supply bus is a power supply bus of a control circuit of the selection lines for selecting rows of image elements of said LCD screen, and activated at each new display window of a video image, and deactivated or disabled between two display windows.

2. The integrated method as claimed in claim 1, further comprising activating a measurement chain that comprises a measurement resistor disposed in series on the power supply bus, a circuit for measuring the current in said measurement resistor and for outputting a corresponding digital measurement signal, a comparison circuit for comparing said digital measurement signal provided in order to provide if appropriate a signal for detecting an image defect.

3. The integrated method as claimed in claim 2, wherein the digital measurement signal is compared with an expected pulsed periodic signal, wherein the expected pulse periodic signal is synchronous to a scan signal of the selection lines.

4. An integrated method for a detection of a display defect of an image in an LCD screen comprising pixel electrodes arranged in matrix fashion in data lines and selection lines, a common counter-electrode and image display means piloted by a video signal, the method comprising:

applying control voltage levels to said pixel electrodes via said data lines and said selection lines and to the common counter-electrode, wherein said video signal, the image display means, the selection lines, the data lines and the pixel electrodes form an image display control video chain;

verifying an integrity of said image display control video chain, by means of detecting a consumption of current on at least one power supply bus of said image display means during capacitive charges or discharges of the data lines and/or the selection lines of the LCD screen; and wherein said at least one power supply bus is a power supply bus of a control circuit of the data lines associated with the image display means of said LCD screen, and/ or to a power supply bus of the common counter-electrode, and activated in a period between two display windows of a video image and deactivated during each of the two display windows of the video image.

5. The integrated method as claimed in claim 4, further comprising generating a corresponding current inrush in the power supply bus of the common counter-electrode using a video test image during said activation periods, wherein said video test image is configured such that one and same gray level is applied on the on columns.

6. The integrated method as claimed in claim 5, wherein said video test image is configured such that one and same first gray level or one and same second gray level on columns, alternately at a row frequency, wherein said first and second gray levels are corresponding to a lowest and a highest level of the gray scale, respectively.

7. The integrated method as claimed in claim 5, wherein said video test image corresponds to one column out of two display for at least a screen using a mode of addressing of a type employing column inversion.

8. The integrated method as claimed in claim 5, wherein the control circuit comprises several elementary components, each of the several elementary components control a group of columns, wherein said video image corresponds to a display on columns of a particular elementary component to detect a defect of said elementary component.

9. The integrated method as claimed in claim 8, further comprising the use of a video image sequence, comprising an image for each of said elementary components of the control circuit.

10. The method as claimed in claim 4, further comprising comparing the digital measurement signal with an expected pulsed periodic signal, wherein the expected pulsed periodic signal is synchronous to a scan signal of the selection lines.

* * * * *